United States Patent [19]
Yamakawa

[11] Patent Number: 6,072,516
[45] Date of Patent: Jun. 6, 2000

[54] IMAGE FORMING METHOD AND APPARATUS WITH MULTI-BEAM LIGHT SOURCE CAPABLE OF CHANGING A WRITING DENSITY

[75] Inventor: Takeshi Yamakawa, Huzisawa, Japan

[73] Assignee: Ricoh Company, Ltd., Tokyo, Japan

[21] Appl. No.: 09/039,394

[22] Filed: Mar. 16, 1998

[30] Foreign Application Priority Data

Mar. 14, 1997 [JP] Japan ..................................... 9-060616

[51] Int. Cl.[7] .................................................. G02B 26/08
[52] U.S. Cl. ........................................... 347/233; 347/131
[58] Field of Search .................................... 347/131, 233, 347/234, 236, 238, 240, 246, 251

[56] References Cited

U.S. PATENT DOCUMENTS 5,774,248  6/1998  Komatsu .................................. 347/233

Primary Examiner—N. Le
Assistant Examiner—Lamson D. Nguyen
Attorney, Agent, or Firm—Oblon, Spivak, McClelland, Maier & Neustadt, P.C.

[57] ABSTRACT

An image forming method and apparatus use a multi-beam light source in a way that enables changes in writing density to be quickly made. A rotating mechanism that has the multi-beam light source rotates about an optical axis of a light beam from the multi-beam light source. A driving mechanism is included for driving the rotating mechanism, and a detecting mechanism is included for detecting a rotating position of the rotating mechanism. A controller controls the driving mechanism in either a reference mode or a positioning mode of operation. In the reference mode, the rotating mechanism is rotated to first position, which is determined by the detecting mechanism. In the positioning mode, the rotating mechanism is rotated to another position relative to the first position according to the reference mode.

19 Claims, 10 Drawing Sheets

IMAGE FORMING METHOD AND APPARATUS WITH MULTI-BEAM LIGHT SOURCE CAPABLE OF CHANGING A WRITING DENSITY

BACKGROUND OF THE INVENTION

1. Field of the Invention

The present invention relates to an image forming method and apparatus, with a multi-beam light source, capable of changing a writing density. More particularly, the present invention relates to photocopiers, printers and facsimile methods and devices that employ a multi-beam light source to expose a photoconductive member by more than one laser beam according to an image data.

2. Description of the Related Art

Image forming apparatuses with multi-beam light sources are known, some of which provide a function of changeable writing density. In such devices, a laser diode and a beam polarizing unit are used for producing the multiple light beams. Beams are first produced, then processed in a beam polarizing unit and subsequently scanned across a photoconductive member. The beams form respective beam spots in a sub scanning direction, and thus the photoconductive member is exposed by more than one beam at the same time.

In above-mentioned image forming apparatus with the multi-beam source, a variable-pitch unit is provided for changing a pitch between beam spots in the sub-scanning direction on the photoconductive member. This variable-pitch unit has a beam generating unit that is rotated about an optical axis of the source of light. Also included are a motor for driving the variable-pitch unit and a position detecting unit for detecting a rotation of the beam generating unit.

FIG. 8 shows a conventional digital copier with a multi-beam light source. In particular, this digital copier has an image reading unit 11, a printing unit including a laser beam scanning unit 27 and an ADF (automatic document feeder) 27. The ADF 27 feeds documents to a contact glass 14 one sheet at a time and the sheet on the contact glass 14 is read by the image reading unit 11. When the reading operation is finished, the ADF 27 removes the sheet.

The image reading unit 11 has a first carriage, which has a document-illuminating lamp 15, a reflector 16 and a first mirror 17, and a second carriage, which has a second mirror 18 and a third mirror 19. When the image reading unit 11 reads an image of a document, the first carriage moves with a uniform speed and the second carriage follows the first carriage at half the speed of the first carriage.

By moving the first carriage and second carriage in this manner, an image of the sheet on the contact glass 14 is scanned. As part of the scanning operation, the document-illuminating lamp 15 and the reflector 16 illuminate the document on the contact glass 14, and a reflected light from the document is sent to a CCD (charge-coupled device) sensor 21 and the image of the document is formed on the CCD sensor 21 by way of the first mirror 17, second mirror 18, third mirror 19 and color filter 20.

The CCD sensor 19 converts the received optical signal of the image to an electrical signal and outputs the electrical signal as an electrical, analog signal. When a color CCD, which consists of three CCD lines (for red, green and blue, for example) is used, the image reading unit 11 can also read color documents.

After finishing the reading operation, the first carriage and the second carriage return to a home position. The analog image signal of the image of the document outputted from the CCD sensor 22 is converted to a digital image signal by an analog/digital converter. The resulting digital image signal is then processed, for example, by converting to a binary signal, converting to a multiple value, performing half toning, scaling and editing operations, at an image processing unit 23.

In the print unit 12, a photoconductive drum 25 rotates and is charged uniformity by a charging unit 26. The charged photoconductive drum 25 is exposed by a laser beam outputted from a laser beam scanning unit 27 and a electrostatic latent image is formed on the photoconductive drum 25 according to the digital image signal from the image processing unit 23. A developing unit 28 then develops the electrostatic latent image on the photoconductive drum 25.

A recording paper is fed from a paper feeder selected from among candidate paper feeders 33, 34 and 35. The recording paper from the selected paper feeder is fed to a register roller 36 and fed to the photoconductive drum 25 with a suitable timing for the developed image on the photoconductive drum 25 to coincide with the paper fed by the register roller 36. Accordingly, the developed image on the photoconductive drum 25 may then be transferred to the recording paper.

Next, the recording paper is separated from the photoconductive drum 25 by a separating unit 31 and fed to a fusing unit 38 by a feeder 37, and the image is fused on the recording paper by the fusing unit 38. After fusing, the paper is fed out of the unit and onto a tray 39. The photoconductive drum 25, after the separating operation, is cleaned and residual toner on the photoconductive drum 25 is removed by a cleaning unit 32.

FIG. 9 is a diagram of the laser beam scanning unit of the digital copier in FIG. 8. A semiconductor laser in a beam generating unit 40 generates a laser beam and the generated laser beam is changed to a parallel ray of light by a collimate lens in the beam generating unit 40 and shaped by an aperture in the beam generating unit 40. This shaped ray of light is compressed in the sub scanning direction by a cylindrical lens 41 and then enters a polygon mirror 42.

The polygon mirror 42 is a regular polygon that rotates with a uniform speed and predetermined direction, under control of a polygon motor 43 (FIG. 8). The rotation speed is decided according to a rotation speed of the photoconductive drum 25, a writing speed of the laser beam scanning unit 27 and a number of reflective surfaces of the polygon mirror 42. The laser beam provided by the cylindrical lens 41 is reflected and directed to an fθ lens 44.

In FIG. 9, the fθ lens 44 is shown to convert the laser beam reflected by the polygon mirror 42, which has constant angular speed, to a laser beam which has constant speed on the photoconductive drum 25. The laser beam from the fθ lens 44 reaches the photoconductive drum 25 by way of a reflective mirror 45 and a dustproof glass element 46.

Moreover, in an out of image area (i.e., a portion of the scanning region in which the image will not be formed), the laser beam from the fθ lens 44 is reflected by a synchronous detecting mirror 147 and reaches a synchronous detecting sensor 48. A synchronous signal that serves as a start timing trigger in the main scanning direction is generated according to a signal output from the synchronous detecting sensor 48.

FIG. 10 is a diagram of the LD (laser diode) unit in the laser generating unit 40. In FIG. 10, the LD unit 50 has a first semiconductor laser LD1, a second semiconductor laser LD2, a first collimate lens L1, a second collimate lens L2, ½ wavelength plate L3, a reflective surface L4, and a polarizing beam splitter L5.

A first laser beam, A, generated by the first semiconductor laser LD1 is converted into a parallel ray of light by the first collimate lens L1 and enters the polarizing beam splitter L5. A second laser beam, B, generated by the second semiconductor laser LD2 is converted into a parallel ray of light by the second collimate lens L2 and a polarizing surface of the second laser beam B is rotated by ½ wavelength plate L3. Next, the laser beam B is outputted with a prescribed angle so as to meet the first laser beam A by way of the reflective surface L4 and the polarizing beam splitter L5.

In this LD unit 50, by rotating the LD unit 50 about an optical axis of the first laser beam A, or the second laser beam B, a pitch of laser beam, a space between the first laser beam A and the second laser beam B about sub scanning direction, can be changed.

In this digital copier, the laser beam generating unit 40 rotates the LD unit 50 about the optical axis of the beam. FIG. 11*a* and 11*b* show this rotating system. FIG. 11*a* is a diagram of a top of view of the laser generating unit 40 in FIG. 9 and FIG. 11*b* is a diagram of a view of direction "C", as shown in FIG. 11*a*. In FIG. 11*a*, a bracket 2 that supports the beam generating unit 40 is set on a wall 27*a* of the laser beam scanning unit 27. The bracket 2 has a circular hole, and a cylindrical part 1*a* of a rotating unit 1 is set in the hole so as to rotate freely on the bracket 2. The wall 27*a* also has a circular hole, which is bigger than the hole in the bracket 2.

The rotating unit 1 can rotate freely on the cylindrical part 1*a*. A brim part 1*b* is set on the cylindrical part 1*a* of the rotating unit 1. Because one end of a spring 1*c* is fastened to the brim part 1*b* and another end of the sprint 1*c* is set around the cylindrical part 1*a*, the rotating unit 1 is pushed to the bracket 2.

In the rotating unit 1, there is the LD unit 50. An axis of rotation of the cylindrical part 1*a* is set in parallel with the axis of the first laser beam A or the second laser beam B. The first laser beam A and the second laser beam B are outputted from the cylindrical part 1*a*. A circuit board 3 for controlling the LD unit 50 is connected to the rotating unit 1 with a bracket 3*a*.

In FIG. 11*b*, there is a spring 47 between the rotating unit 1 and the bracket 2, and the rotating unit 1 is urged by a contracting force of the spring 47 so as to rotate. This rotating of the rotating unit 1 is stopped and controlled by the controlling component 4. The controlling component 4 is controlled by a stepping motor 5 which is set on the bracket 2 and the stepping motor 5 is driven by a command from a main board.

FIGS. 12*a* and 12*b* show the controlling component 4 and related components. A screw part 5*a* is set on the axis of the stepping motor 5 and the screw part 5*a* meshes with a female threaded screw in the controlling component 4.

FIG. 12*b* is a view of the components in FIG. 12*a*, from the direction D. A shape of the controlling component 4 is in the form of a "D" for blocking the rotation of the controlling component 4. An arresting rotation component 6 is connected to the stepping motor and the arresting rotation component 6 has a hole which is in the form of a "D". The controlling component 4 fits the hole of the arresting rotation component 6 and protrudes or recedes by rotating the stepping motor 5.

In reference to FIGS. 11*a* and 11*b*, when the stepping motor 5 rotates, the rotating unit 1 is rotated about the cylindrical part 1a because the controlling component 4 protrudes or recedes. By this rotation of the rotating unit 1, because the LD unit 50 on the rotating unit 50 is rotated also, the space between the first laser beam A and the second laser beam B about the sub scanning direction on the photoconductive drum 25 is changed.

There is a sensor interrupting part 1*d* which is in the form of a "L" on the rotating unit 1. The interrupting part 1*d* is inserted between a photo interrupter 7 and interrupts a light in the photo interrupter 7 by rotating of the rotating unit 1. By this interruption, it is detected that a position of the LD unit 50 is in a home position.

FIG. 13 shows exemplary rotations of the rotating unit 1 for different desired dot pitches. Previously, for changing a writing density by laser beam sub scanning direction, first, the rotating unit 1 is rotated to the home position. Next, the stepping motor 5 is driven according to an inputted predetermined number of steps and the LD unit 50 on the rotating unit 1 is rotated by the predetermined angle. For example, for changing from 400 dpi (dots per inch) to 600 dpi, first, the rotating unit 1 is rotated with angle "a" in FIG. 13, next, the rotating unit 1 is rotated with angle "b". In this changing, a rotating distance of (a+b) is needed.

It is preferable that this rotating distance is short so as to enable a quick density change. FIG. 14 is a diagram of characteristics of a stepping motor. If a high frequency signal is inputted for fast execution, a torque becomes small. Therefore, it is preferable that this rotating distance is short.

There is a backlash between the screw part 5*a* and the controlling component 4. Therefore, for accurately controlling the rotation angle of the rotating unit 1, it is needed that a positioning control is executed by one way rotating. In other words, if a positioning control is executed by a direction of uplift in FIG. 11*b*, a positioning control has to be executed by a direction of uplift on every occasion.

If a same number of steps is inputted to the stepping motor 5, there is difference of amount of rotating between the case of uplifting and moving down. For instance, in FIG. 15, in spite of the number of steps input for setting 400 dpi, the rotating unit 1 moves to a position Q in the case of moving down and a position P in the case of uplifting because of backlash $\Delta X$. Because there is the backlash $\Delta X$, an amount of rotating is not accurate and it is impossible that an accurate density change can be made.

This accuracy phenomenon occurs in the case of setting the home position. For correct density of writing by getting a correct home position, a positioning control is executed by one way rotating. In FIG. 16, the case is shown for changing from 400 dpi to 600 dpi, a rotation positioning control for the home position and for 600 dpi are executed by direction of uplift also. For this rotating to get a correct density, it is necessary that the amount of rotating "a" and $\Delta X$ are executed as a substitute for the amount of rotating "a" in FIG. 13, and a positioning control to HP (home position) is executed by uplift. Next, a rotating to a position for 600 dpi is executed by uplift relative to the HP.

In this case, the amount of rotating is $(a+\Delta X+\Delta X+b)=(a+b+2\Delta X)$. This amount of rotating $(a+b+2\Delta X)$ is not preferable because the rotation distance is too long.

As described above, in a conventional digital copier with a multi-beam light source, because the amount of light source rotation for changing a writing density is long, a writing density change operation also takes a long time.

SUMMARY OF THE INVENTION

Accordingly, an object of the present invention is to provide a novel image forming method and apparatus with a multi-beam light source unit configured to change a writing density that obviates the above-mentioned problems.

Another object of the present invention is to provide an image forming method and apparatus with a multi-beam light source that is able to change a writing density in a short period of time.

These and other objects are accomplished by the present invention by providing a rotating mechanism having a multi-beam light source that rotates about an optical axis of the multi-beam source of light. A driving mechanism is also provided for driving the rotating mechanism. A detecting mechanism detects the rotation position of the rotating mechanism. A control mechanism controls the driving mechanism, and the control mechanism has a reference mode that controls the driving mechanism to rotate the rotating mechanism to a first position according to a detecting event by the detecting mechanism and a positioning mode which is a mode of controlling the driving mechanism to rotate the rotation mechanism to other positions relative to the first position according to the reference mode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
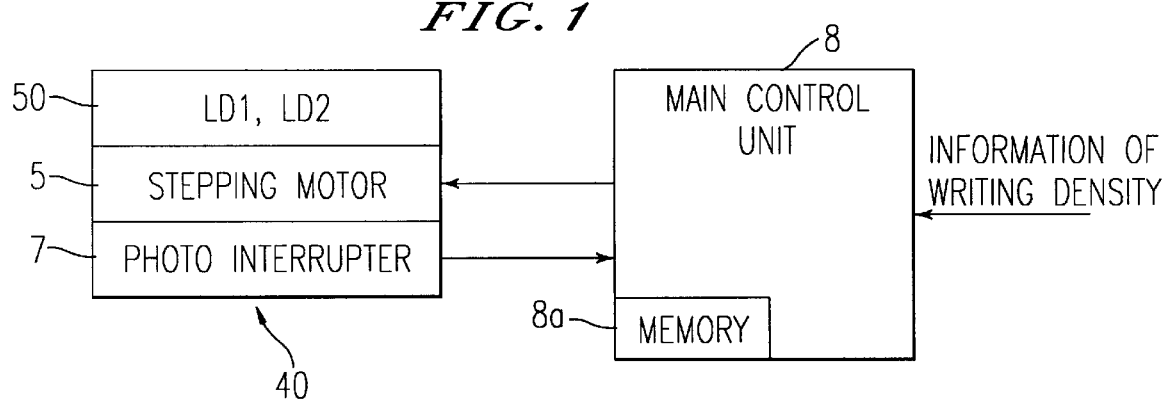
FIG. 1 is a block diagram of a laser writing part of a digital copier according to the present invention.

Referring now to the drawings, wherein like reference numerals designate identical or corresponding parts throughout the several views, FIGS. 8–12 are first used to discuss selected aspects of the present invention, and then other aspects are discussed in reference to FIGS. 1–7.

Figure 11A:
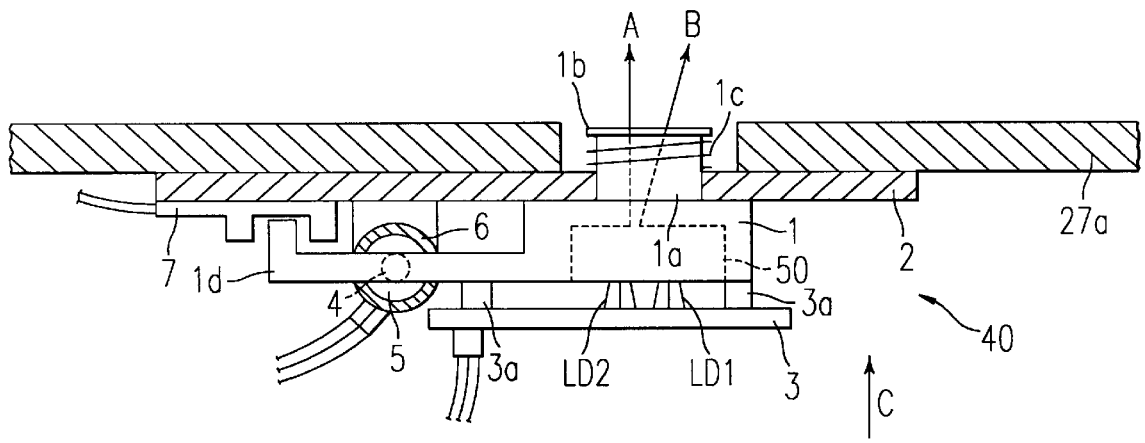
FIGS. 11a and 11b are diagrams of a rotation system of the digital copier in FIG. 8.

In FIG. 11a, when a writing density is changed, the LED unit 50 on the rotating unit 1 is rotated. A stepping motor is used for this rotation operation. Other motor types can be used—in the case of an ordinary motor, a time of supplying electric power is used for controlling the rotation, not the number of steps.

Figure 11B:
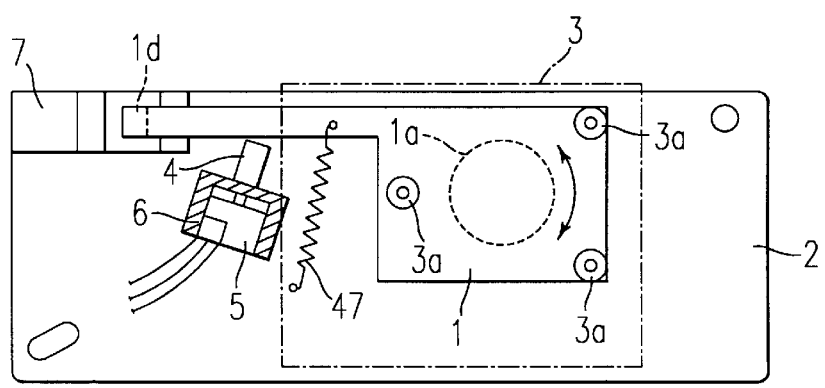
Figure 12A:
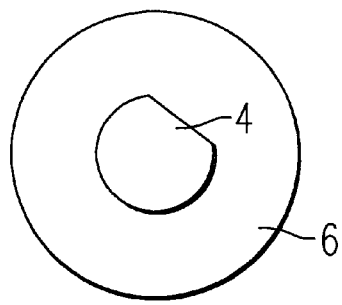
FIGS. 12a and 12b are diagrams including components associated with the controlling component in FIGS. 11a and 11b.
Figure 12B:
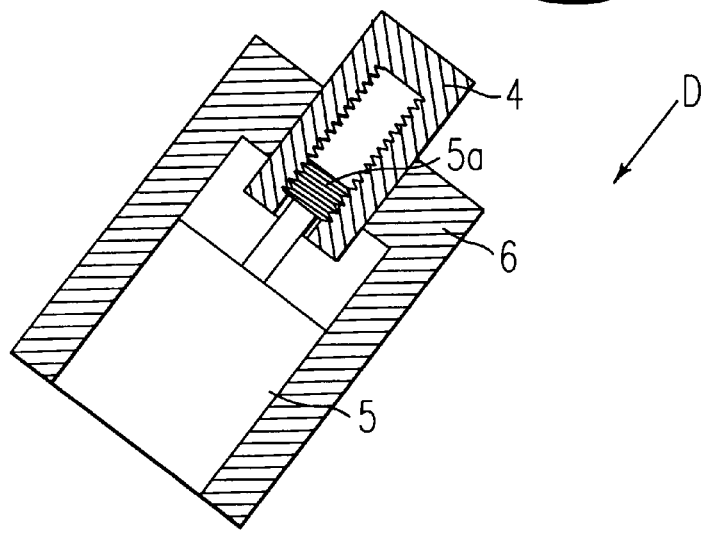
Figure 13:
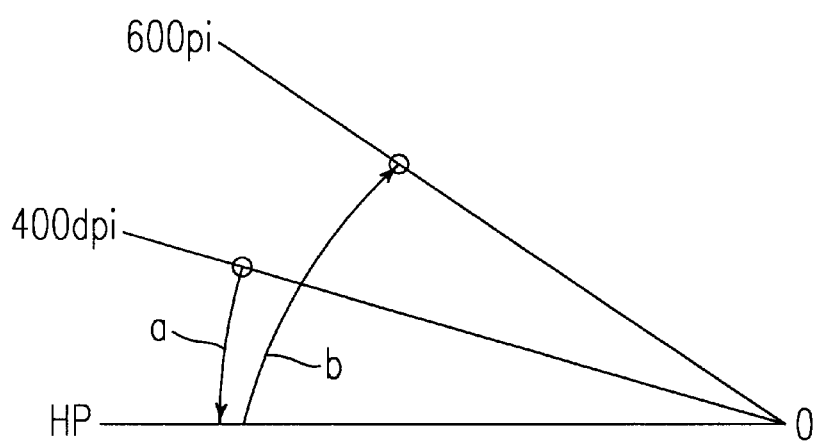
FIG. 13 is a rotation diagram illustrating a rotation of the rotating unit.

In the digital copier according to this invention, both a reference mode and a positioning mode are employed. First, the reference mode is executed. In FIGS. 11a and 11b, a position of the rotating unit 1 is detecting by the interrupting part 1d and the photo interrupter 7. In the reference mode, a position of 400 dpi or 600 dpi is determined with reference to the home position which is a position of inverting the interrupting part id of the photo interrupter 7. This action of first positioning to a position of 400 dpi or 600 dpi which is used to set the position for writing according to a home position is called reference mode.

In this case, when the writing density is changed from 400 dpi to 600 dpi, the rotating unit 1 does not return to the home position in this digital copier according to this invention.

Figure 6:
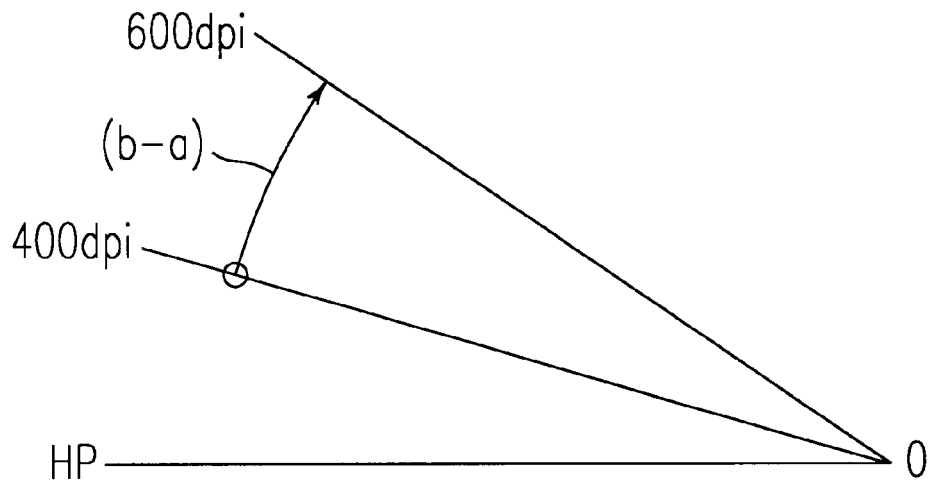
FIG. 6 is an action diagram of the rotating unit for changing a writing density from 400 dpi to 600 dpi in the digital copier according to the present invention.

FIG. 6 shows an action of the rotating unit 1 for changing a writing density from 400 dpi to 600 dpi in this invention. In FIG. 6, when a writing density is changed from 400 dpi to 600 dpi, the rotating unit 1 is rotated from a position of 400 dpi to a position of 600 dpi according to the position of 400 dpi which is positioned in the reference mode without returning to the home position. In this action of rotating from 400 dpi to 600 dpi, the rotation is executed by inputting the number of steps needed to rotate from 400 dpi to 600 dpi to the stepping motor. This action which is positioned according to the position set in the reference mode is called the positioning mode.

In the case of FIG. 6, it is not necessary to rotate for a backlash because a direction of rotating from 400 dpi to 600 dpi in the positioning mode is the same as a direction of rotating in the reference mode. Previous digital copiers needed (a+b+2$\Delta X$) for the amount of rotating for changing from 400 dpi to 600 dpi in FIG. 16 because this rotating is executed according to the position of home position as a reference. In the digital copier according to this invention, only (b−a) is needed because the rotating is executed according to the position of 400 dpi which is set in the reference mode. Therefore, in the digital copier according to this invention, a shortening of (2a+2$\Delta X$) is executed.

Figure 7:
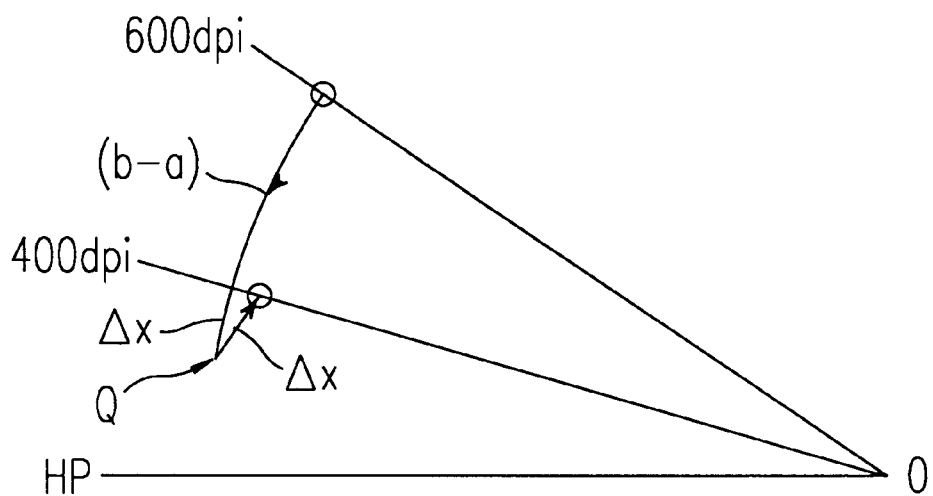
FIG. 7 is a diagram showing a rotation of the rotating unit when a writing density is changed from 600 dpi to 400 dpi in the digital copier according to the present invention.
Figure 8:
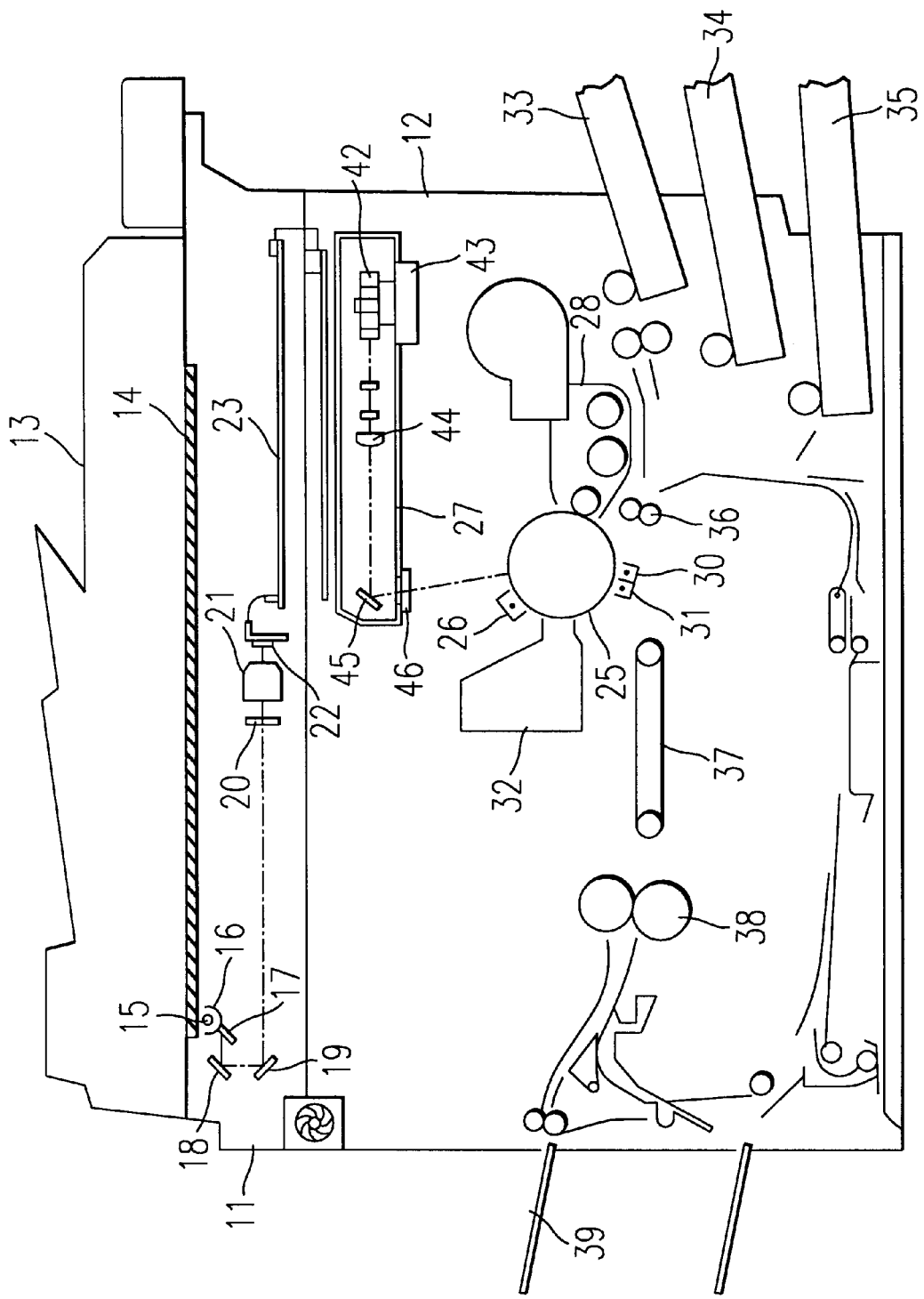
FIG. 8 is a diagram of a digital copier with a multi-beam light source.
Figure 10:
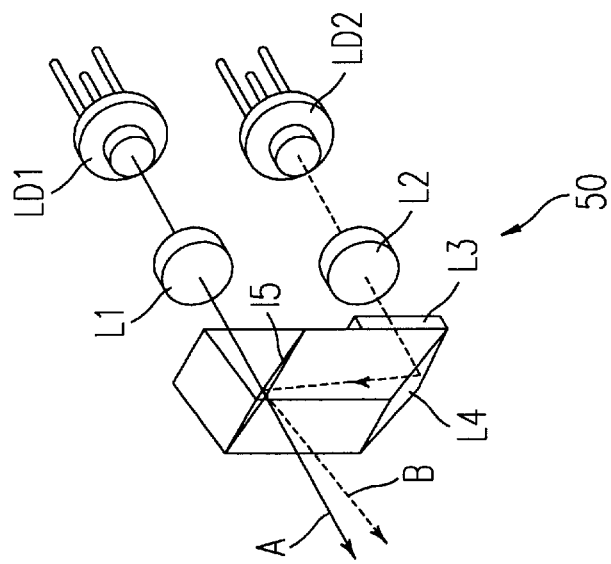
FIG. 10 is a diagram of the LD unit in the laser generating unit 40 of the digital copier in FIG. 8.
Figure 9:
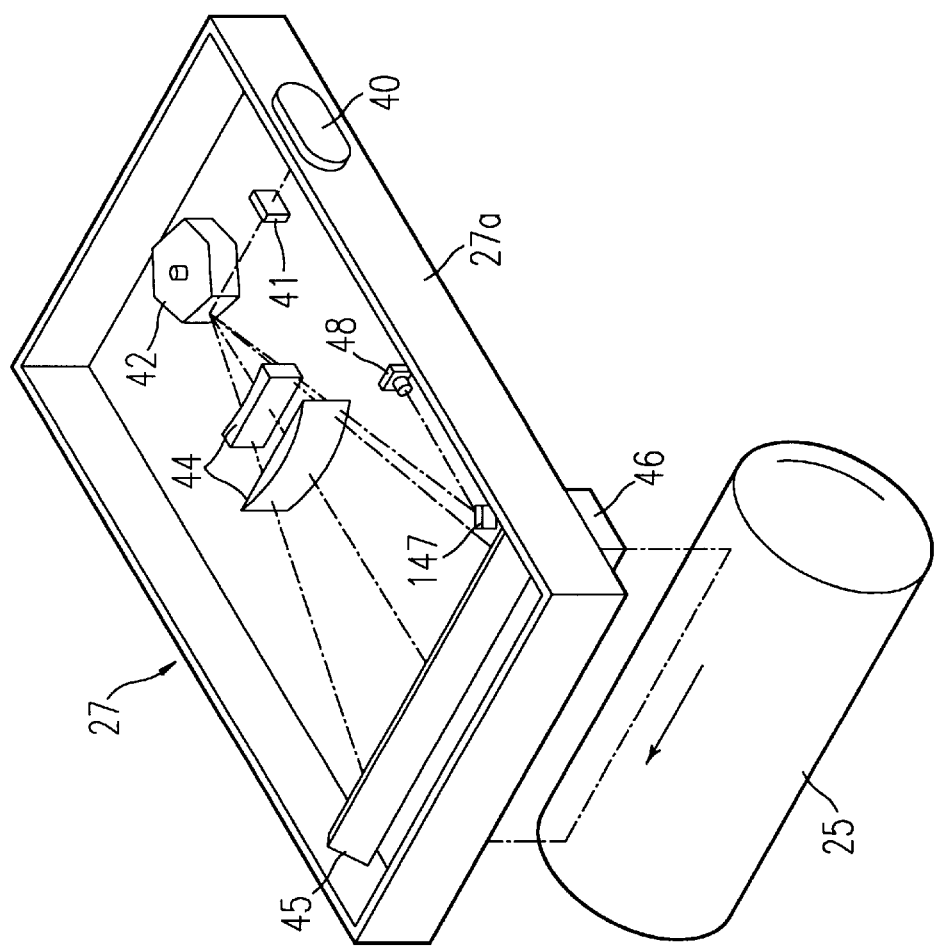
FIG. 9 is a diagram of the laser beam scanning unit of the digital copier in FIG. 8.

Next, FIG. 7 shows a rotation of the rotating unit when a writing density is changed from 600 dpi to 400 dpi. In this rotating operation, it is necessary to consider backlash because a direction of rotation from 600 dpi to 400 dpi is different from a direction of rotation from the home position to 400 dpi in the reference mode. For rejecting backlash, first the rotating unit 1 is rotated from a position of 600 dpi toward the direction of 400 dpi, with an overshoot amount of $\Delta X$ such that the maximum deflection position of 400 dpi is at a point Q, as shown.

Figure 16:
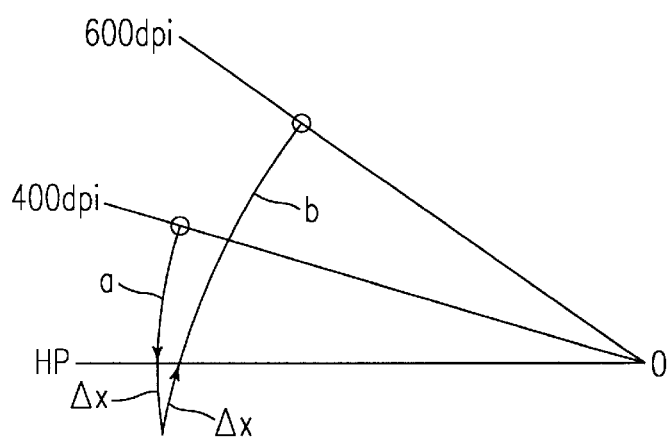
FIG. 16 is a diagram of a rotation of the rotating unit.

Next, the rotating unit 1 is rotated to the position of 400 dpi in the uplift direction, which is the same as the direction of the reference mode. The mode of this action of rotating from the position of 600 dpi to the position of the 400 dpi is called the positioning mode, where the amount of rotating in this action is (b−a+2$\Delta X$). In conventional digital copiers, it is necessary to rotate by (a+b+2$\Delta X$), as indicated in FIG. 16. Therefore, in the digital copier according to invention, it is possible that amount of rotation is shortened by 2a. The (ΔX) is the amount of rotation which is a backlash of the controlling component 4 and the screw part 5a in FIG. 12.

According to the present invention, FIG. 1 shows a control unit having a memory 8a in a main control unit 8 that receives information from the rotating unit 1. The main control unit 8 has a CPU, a RAM, a ROM, which communicate by way of a bus, as well as and other related components that aid in controlling the laser generating unit 40 which has the LD unit 50 including LD1 and LD2, the stepping motor 5 and photo interrupter 7. The main control unit 8 controls the reference and positioning modes of operation.

Figure 2:
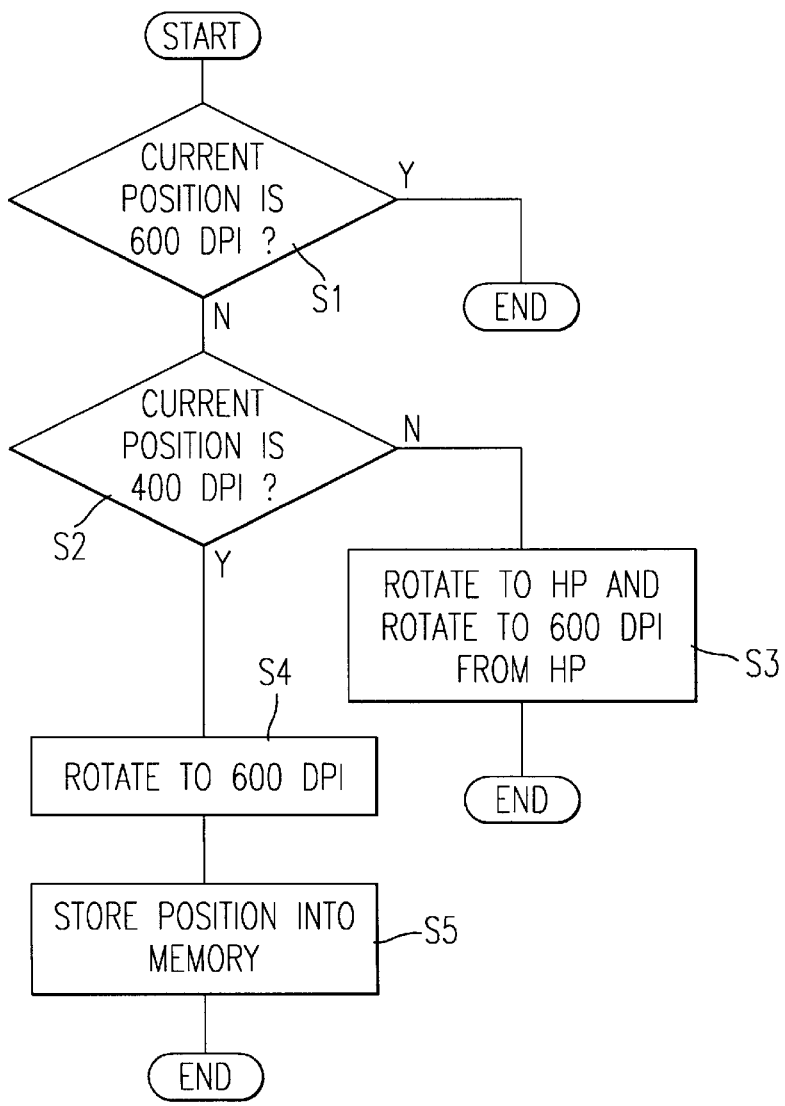
FIG. 2 is a flowchart of a process for setting a position of 600 dpi.

FIG. 2 is a flowchart of a process for setting the position of 600 dpi, executed in the main control unit 8. First, in step S1, an inquiry is made regarding whether a current position is set for 600 dpi. If the response is affirmative, the process of setting the position to 600 dpi ends and an image forming process is started.

However, if the response is negative, another inquiry is made in step S2 regarding whether the current position is 400 dpi. If the response to the inquiry in step S2 is negative, the process proceeds to step S3 where the rotating unit 1 is rotated to the home position and then rotated to the position of 600 dpi with reference to the home position. However, if the response to the inquiry in step S2 is affirmative, the rotating unit 1 is rotated to the position of 600 dpi with reference to the position of 400 dpi without rotating to the home position. Subsequently, to the rotation in step S4, the position is stored in the memory 8a and the process ends.

Figure 3:
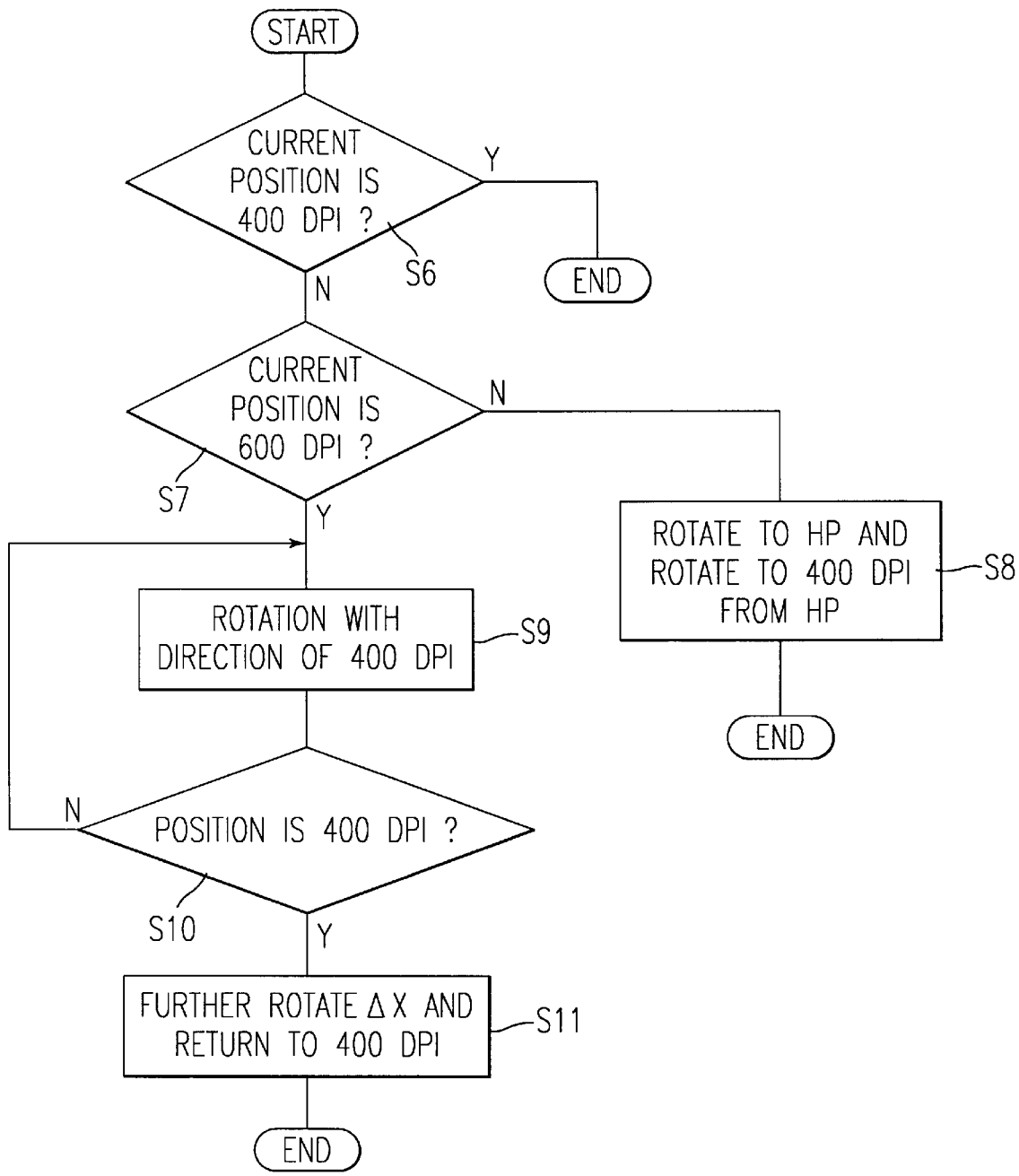
FIG. 3 is a flowchart of process for setting a position of 400 dpi.

FIG. 3 is a flowchart for setting the position of 400 dpi. The process begins in step S6 where a determination is made regarding whether the current position is 400 dpi. If the response is affirmative, the process of setting the position to 400 dpi ends and an image forming process begins.

When the current position is not 400 dpi, the process proceeds to step S6 where an inquiry is made in step S7 regarding whether the current position is 600 dpi or not. In step S7, when the current position is determined not to be 600 dpi, the process proceeds to step S8 where the rotating unit 1 is rotated to the home position and then rotated to the position of 400 dpi from the home position with reference to the position of the home position. However, if the response to the inquiry in step S7 is affirmative, the process proceeds to steps S9 and S10 where the rotating unit 1 is rotated to the position of 400 dpi, according to the feedback approach shown in FIG. 3. Once it is determined in step S10 that the current position is for 400 dpi, the process proceeds to step S11 where the rotating unit 1 is further rotated by an amount ΔX to the point Q in FIG. 7 and then returned to the position of 400 dpi so as to compensate for backlash.

Figure 4:
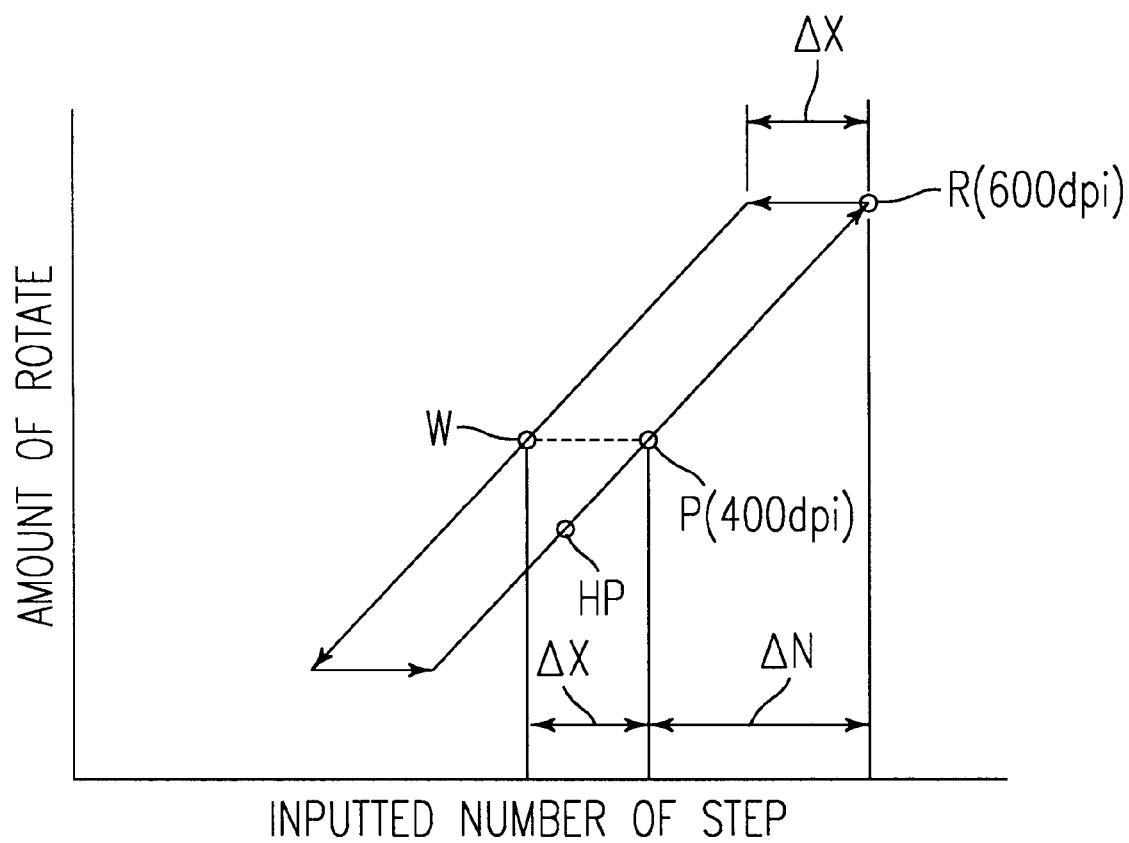
FIG. 4 is a graph showing a relationship of an inputted number of steps and a corresponding amount of rotation.

FIG. 4 shows a relationship of an inputted number of steps and a corresponding amount of rotation. When there is no backlash, represented by the point "P," the predetermined number of steps is input as ΔN. However, when backlash is present, as represented by the point "W," it is necessary to input ΔN and ΔX steps so as to reject the backlash.

In the present digital copier embodiment, it is possible that a time required to change writing density is shortened. When changing writing density, other system changes are also required such as a polygon mirror rotating speed and a condition of image forming process, but these other changes are not longer than the time required to rotate the rotating unit 1. Consequently, by shortening the time required to change the printing pitch, the present invention has a direct effect of changing the overall speed of the photocopier.

Furthermore, because the amount of overall rotation is relatively short, the mount of sliding surface deterioration of the rotating unit is decreased, thereby enhancing system reliability.

Figure 5:
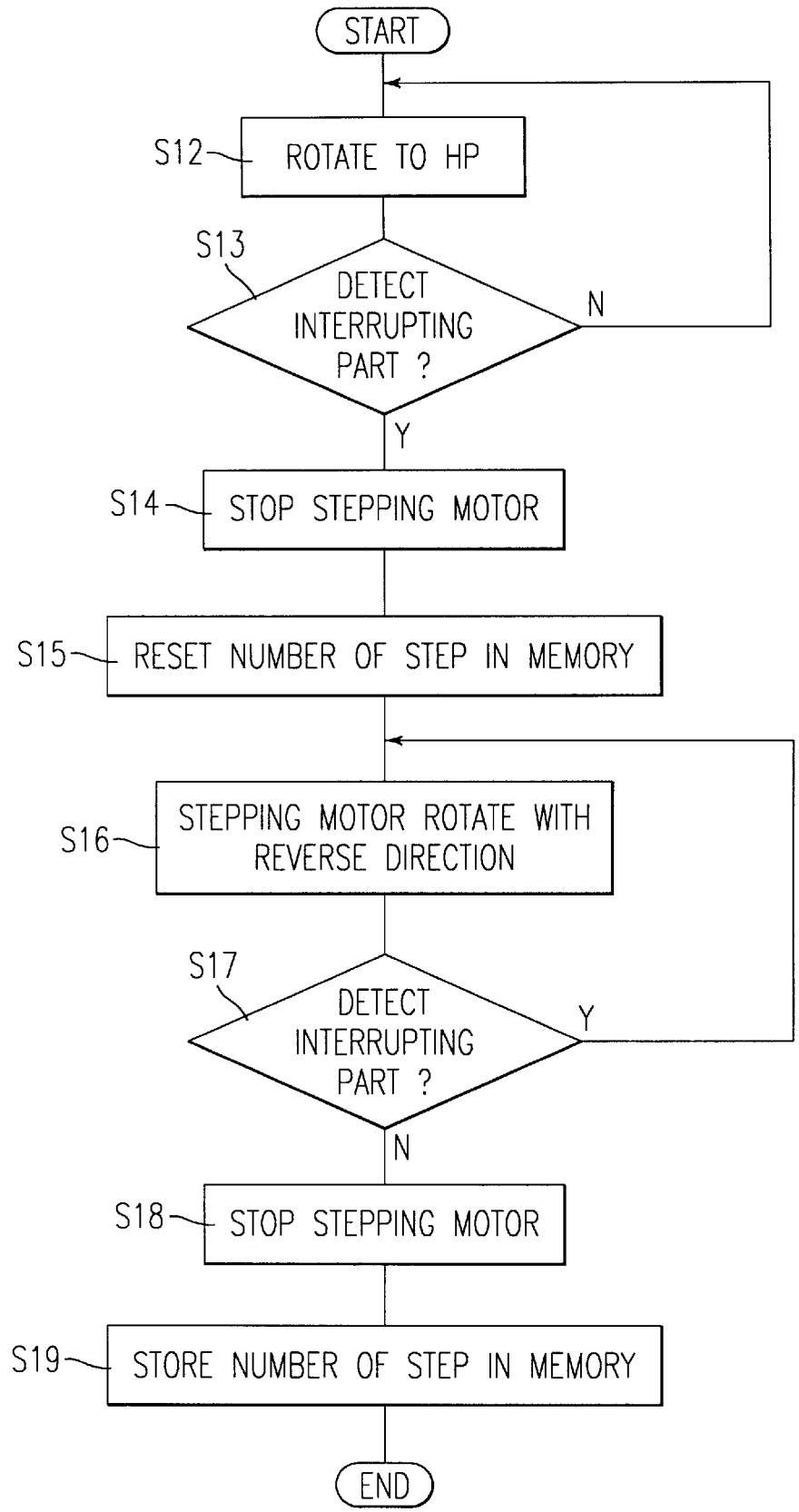
FIG. 5 is a flowchart of a process for detecting a number of steps of $\Delta X$ which constitute backlash.

FIG. 5 is flowchart of a process for determining a number of steps for ΔX. The process begins in step S12 where the rotating unit is located between the home position and the 600 dpi position, the rotating unit is rotated to the home position. In step 13, a determination is made regarding whether the photo interrupter 7 detects the presence of the interrupting part 1d. If not, the process returns to step S12. However, if the interruption part 1d is detected, the process proceeds to step S14 where the stepping motor is progressively stepped. In step S15, a number of steps in memory 8a is reset.

Next, in step S16, the stepping motor is stepped in a reverse direction. In this reverse rotation, the rotating unit 1 does not rotate until the screw part 5a is uplifted by an amount of the backlash, see FIG. 12b. After uplifting by the amount of the backlash, the photo interrupter 7 cannot detect the interrupting part 1d because the rotating unit 1 starts rotating.

In step S17, when the photo interrupter 7 cannot detect the interrupting part 1d, the stepping motor is stopped in step S18. In step S19, the number of steps relative to the reset number of steps held in memory 8a (step S15) to stop stepping motor in step S18 is stored in the memory 8a. This stored number of steps in step S19 corresponds with the amount of backlash ΔX.

Figure 14:
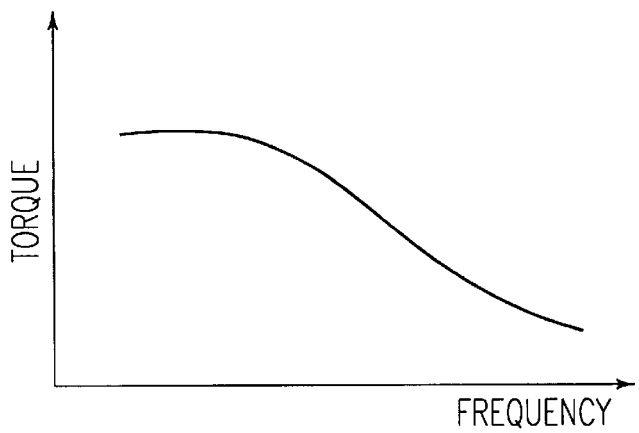
FIG. 14 is a diagram of characteristics of a stepping motor.
Figure 15:
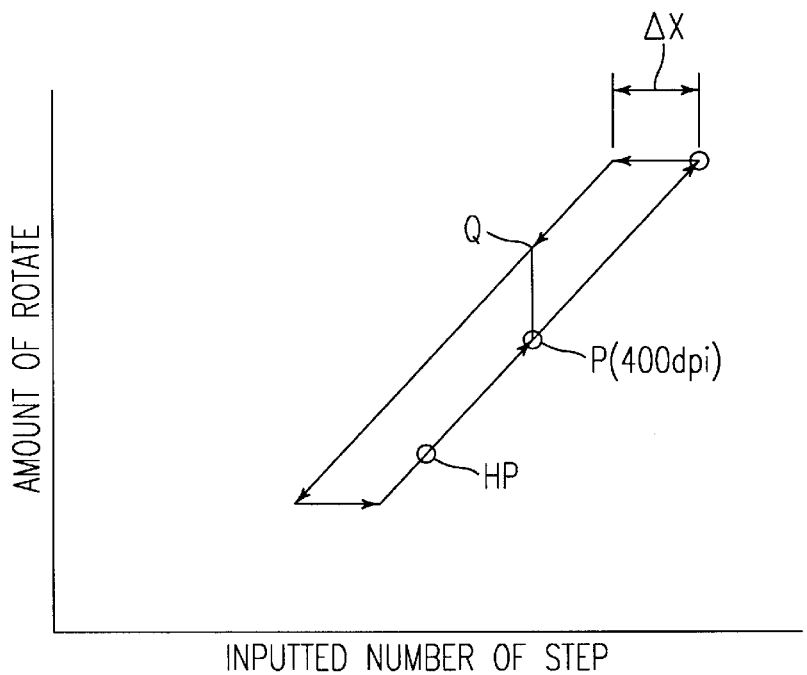
FIG. 15 is a graph of a relationship between an inputted number of steps and a rotation amount.

In FIG. 14, the graph shows that when a frequency of an input signal to the stepping motor for speeding the rotation of the stepping motor, the torque of the stepping motor decreases. In FIG. 11b, when the rotating unit 1 rotates counterclockwise, less torque is necessary as compared with when rotating clockwise because the clockwise rotation opposes the force of the spring 47. Therefore, the time to rotate the rotating unit 1 can be short due to a control of the input signal frequency to the stepping motor which for rotating counterclockwise is higher than for rotating clockwise.

In the present digital copier embodiment according to the present invention, the time required to change the writing density is shortened because the rotating unit returns to the home position only in the reference mode of operation and does not return to the home position in the positioning mode of operation after the reference mode has been performed. However, sometimes, there is case that the position of the rotating unit cannot be accurately detected because of, for example, a sporadic error and error over time. For countering this case, in according to the present invention, the reference mode is executed according to some information (such as a fault mode detection event). Other cases include (1) every time the power is turned on, (2) after a predetermined number of power-on events, (3) after a predetermined number of papers have been processed, (4) after a predetermined number of image forming operation have been performed, and (5) after a predetermined number of write density changing operations. Such predetermined values may be saved in the memory 8a and/or entered locally by the operator or remotely by a network operator or a remote user terminal.

Moreover, it is possible to reject a cumulative amount of drift from the correct position by executing the reference mode.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of an application specific integrated circuit or by interconnecting an appropriate network of conventional components, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

This document is based on Japanese patent application 9-060616 filed in the Japanese Patent Office on Mar. 14, 1997 the entire contents of which is hereby incorporated by reference.

I claim:

1. An image forming apparatus configured to change a writing density comprising:
   means for rotating a multi-beam light source about an optical axis of a light beam produced by said multi-beam light source;
   means for driving said means for rotating;
   means for detecting a rotation position of said means for rotating; and
   means for controlling said means for driving when operating in at least one of a reference mode and a positioning mode, wherein
      when in said reference mode, said means for controlling controls an operation of said means for driving so as to drive said means for rotating to a first position according to a position detection event detected by said means for detecting, and
      when in said positioning mode, said means for controlling controls the operation of said means for driving so as to drive said means for rotating to another position relative to the first position, wherein
   in said positioning mode, an amount of driving of said means for driving is set to correspond with whether said means for rotating experiences backlash.

2. An image forming apparatus according to claim 1, wherein:
   in the operation of said reference mode, said means for controlling controls said means for driving after detecting said first position such that said rotating means is rotated in a same direction but further than the first position and then rotated in a reverse direction, where the reverse direction is relative to the same direction.

3. An image forming apparatus according to claim 2, wherein:
   in said reference mode, said means for rotating is rotated by an amount that is at least as great as an amount of backlash acting on said means for rotating.

4. An image forming apparatus according to claim 1, wherein:
   the amount of driving of said means for driving includes the amount of backlash experienced by said means for rotating.

5. An image forming apparatus according to claim 1, wherein:
   said means for driving includes a stepping motor, and when said means for rotating is subject to a predetermined amount of torque associated with a particular direction of rotation, said means for driving changes a frequency of an input signal applied to said stepping motor in accordance with the particular direction of rotation of said means for rotating.

6. An image forming apparatus according to claim 1, wherein an operation of said reference mode is executed by said means for controlling after an occurrence of a predetermined event that includes at least one of a fault mode detection event and after a predetermined number of operation events.

7. An image forming apparatus according to claim 6, wherein said predetermined number of operation events relates to a number of times system power is turned on.

8. An image forming apparatus according to claim 6, wherein said predetermined number of operation events relates to a number of image forming operations performed.

9. Am image forming apparatus according to claim 6, wherein said predetermined number of operation events relates to a number of times a writing density has been changed.

10. A writing density changing method in an image forming apparatus, comprising the steps of:
    rotating a rotating mechanism about an optical axis of a light beam emitted from a multi-beam light source included in said rotating mechanism;
    driving the rotating mechanism;
    detecting a rotation position of said rotating mechanism; and
    controlling said driving step by operating in at least one of a reference mode and a positioning mode, wherein
       when in said reference mode, said controlling step controls an operation of said driving step so as to drive said rotating mechanism to rotate said rotating mechanism to a first position according to a position detection event detected in said detecting step,
       when in said positioning mode, said controlling step controls an operation of said driving step so as to drive said rotating mechanism to rotate said rotating mechanism to another position relative to the first position according to the reference mode, wherein,
    in said positioning mode, said driving step drives said rotating mechanism by an amount that is effected by whether backlash effect is present.

11. The method according to claim 10, wherein:
    in said reference mode, said controlling step controls the operation of said driving step after detecting said first position such that said rotating mechanism is rotated in a same direction but further than the first position and then rotated in a reverse direction, where the reverse direction is relative to the same direction.

12. The method according to claim 11, wherein:
    in said reference mode, said rotating step rotates said rotating mechanism by an amount that is at least as great as backlash acting on said rotating mechanism.

13. The method according to claim 10, wherein:
    said driving step drives said rotating mechanism by an amount that compensates for backlash experienced by said rotating mechanism.

14. The method according to claim 10, wherein:
    said driving step includes driving a stepping motor with a control signal when said rotating mechanism is subject to a predetermined amount of torque associated with a particular direction of rotation, said control signal being applied to said stepping motor in accordance with a direction of rotation of said rotating mechanism.

15. The method according to claim 10, wherein said controlling step includes executing said reference mode after an occurrence of a predetermined event that includes at least one of a fault mode detection event and after a predetermined number of operation events.

16. The method according to claim 15, wherein said predetermined number of operation events relates to a number of times a system power is turned on.

17. The method according to claim 15, wherein said predetermined number of operation events relates to a number of image forming operations performed.

18. The method according to claim 15, wherein said predetermined number of operation events relates to a number of times a writing density has been changed.

19. An image forming apparatus configured to change a writing density comprising:
- a rotating unit having a multi-beam light source that rotates about an optical axis of a light beam emitted from said multi-beam light source;
- a motor configured to drive said rotating unit;
- a detecting unit configured to detect a rotating position of said rotating unit; and
- a control unit configured to control said motor, wherein,
    in said reference mode, said control unit being configured to drive said motor, which in turn drives said rotating unit to a first position as detected by said detecting unit, and
    in a positioning mode, said control unit being configured to drive said motor, which in turn drives said rotating unit to another position relative to the first position according to the reference mode, wherein
in said positioning mode, an amount of driving of said motor is set to correspond with whether said rotating unit experiences backlash.

* * * * *